J. E. Hawkins.

Sheet 1
2 Sheets.

Cracker Mach.

No. 3,326.

Reissued Mar. 16, 1869.

Witnesses;
Jno. O. Wino
Jos. Lilzoomly

Inventor;
John E. Hawkins
By J. J. Coombs
Attorney

J. E. Hawkins.

Sheet 2, 2 Sheets.

Cracker Mach.

No. 3,326. Reissued Mar. 16, 1869.

Witnesses;
Jas C Mino
Jos. L Coombs

Inventor;
John E. Hawkins
By J. L. Coombs
Attorney.

United States Patent Office.

JOHN E. HAWKINS, OF LANSINGBURG, FOR HIMSELF AND JACOB C. HORTON, OF NEW YORK, N. Y., ASSIGNEE OF JOHN E. HAWKINS.

*Letters Patent No.* 66,082, *dated June* 25, 1867; *reissue No.* 3,326, *dated March* 16, 1869.

IMPROVED CRACKER-MACHINE.

The Schedule referred to in these Letters Patent and making part of the same.

*To all whom it may concern:*

Be it known that I, JOHN E. HAWKINS, of Lansingburg, in the county of Rensselaer, and State of New York, have invented a new and useful Improvement in Machine for Manufacturing Crackers; and I do hereby declare that the following is a full, clear, and exact description thereof, reference being had to the accompanying drawings, and to the letters of reference marked thereon.

Figure 1:
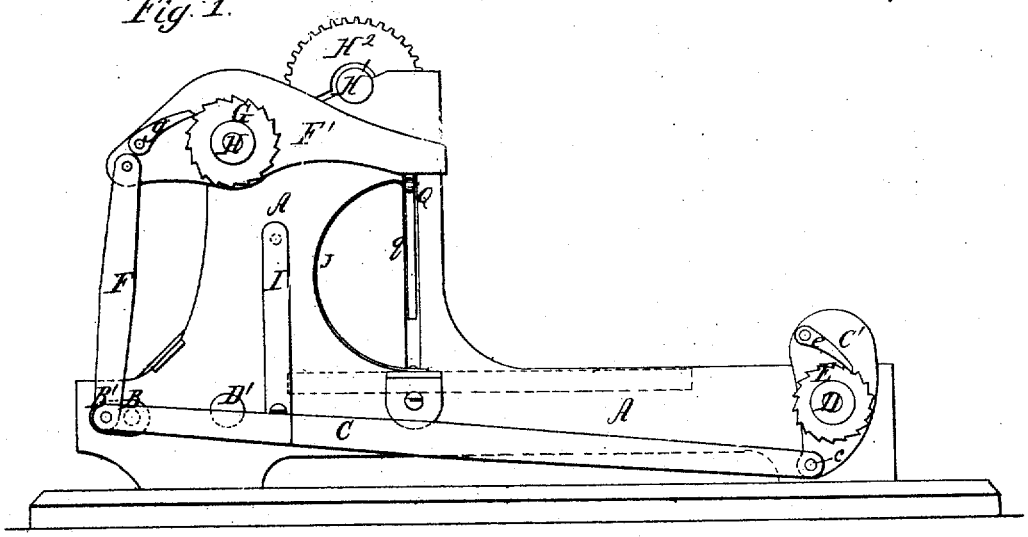
Figure 1 is a side elevation of the machine.
Figure 2:
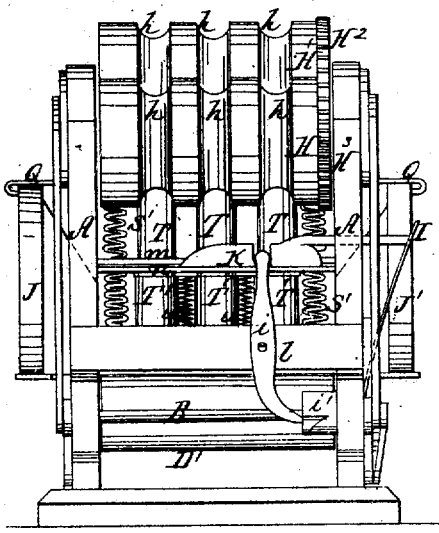
Figure 2 is an end elevation, as seen from the rear.
Figure 3:
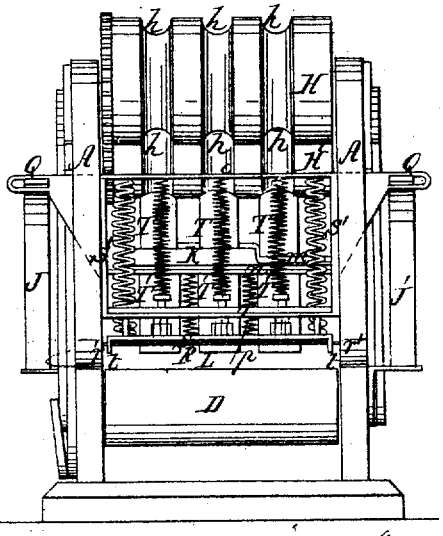
Figure 3 is an end elevation, as seen from the front.

This machine operates by first forming the dough into a series of cylindrical strips, and in cutting from the ends thereof short sections, which are pressed, pricked, and stamped, at a single operation, upon an endless apron, from which they are delivered upon pans of sheet-metal, fully prepared for the oven.

A is the frame of the machine.

B is the main driving-shaft, to which the power is applied.

B′ is a short crank upon the end of said main driving-shaft.

C is a long shaft, pivoted at one end on the crank-pin B′, and at the other end, at *c*, to an oscillating plate, C′, which is pivoted on the journal of the front roller D, which carries the endless apron passing round the two rollers D and D′.

E is a ratchet-wheel, firmly fixed upon the axis of roller D, and

*e* is a pawl, by which said ratchet-wheel and roller D are rotated by an intermittent motion.

F is a shaft, pivoted at its lower end, in common with shaft C, upon the crank-pin B′, and at the other end to an oscillating lever, F′, which is pivoted on the journal of grooved roller H.

G is a ratchet-wheel on the outer end of the axis of said grooved roller H, and

*g* is a pawl, by which an intermittent rotary motion is given to said ratchet-wheel G, and to the grooved roller H.

H¹ is another grooved roller, placed a little higher in the frame than roller H, the peripheries of which rollers come in contact, or nearly so, and the annular grooves in which, *h h*, are exactly opposite each other.

I is a spring, which operates the knife hereinafter described, and

J and J′ are springs, which raise the "docker," or, in other words, the mechanism for pressing, pricking, and stamping the crackers.

K is a reciprocating knife, moving between two plates *m* and *n*, cutting off a section of each of the cylindrical strips of dough (which pass through holes in said knife) at each stroke.

Said knife is moved in one direction by a lever, *i*, pivoted to a cross-bar, *l*, and actuated by a cam, *i′*, on the main driving-shaft B, but is thrown suddenly in the opposite direction by the spring I, when it makes its stroke to cut off the sections of dough.

T T T are vertical tubes, immediately under the grooves *h h h* in the rollers H H¹, which tubes receive the cylindrical strips of dough formed by said grooved rollers.

Said tubes are separated from the lower vertical tubes T′ T′ T′ by the plates *m* and *n*, between which the knife plays, said plates having holes in them corresponding with said tubes.

The knife K is represented in the drawings as having circular holes for the dough to pass through, but it is manifest that apertures of other forms, as quadrangular or elliptical, would answer the same purpose. Nor is it absolutely essential that said knife be thrown by a spring, as it may be moved in both directions by a cam, or other equivalent means; but I prefer a spring-motion on account of the quickness of the stroke which it gives.

The dough is formed into cylindrical strips by passing between the rollers H H¹, by means of the grooves *h h h*, and these cylindrical strips, pending from the rollers, drop into the tubes T T T.

It will be seen that, at each revolution of the driving-shaft B, the roller H, by means of the pawl *g* acting upon the ratchet-wheel G, will be rotated to the extent of one tooth in the ratchet-wheel. This movement will carry each of the dough-cylinders down through one of the tubes T a sufficient distance to form a cracker, by cutting off so much of it as has thus moved downward.

At this movement the knife K is thrown forward by the spring I, cutting off a short section from the end of each of the dough-cylinders, sufficient to form one cracker, and then the knife is moved back by means of the lever *i*, actuated by the cam *i′*.

The sections of dough thus cut off fall through the lower tubes T′ upon the endless apron L, which also has an intermittent motion, communicated by the ratchet-wheel E and pawl *e*, operated by the crank B′, the shaft C, and oscillating plate C′, as will be plainly seen by reference to fig. 1 of the drawings.

As soon as the sections of dough cut off by the knife K fall upon the endless apron, the latter moves forward by its intermittent motion, carrying a row of crackers under the docker, which I will now proceed to describe.

Said docker consists of two plates, *o* and *p*, rigidly attached and moving together, and two other plates, *r* and *s*, in like manner rigidly attached and moving together. This mechanism will be more easily understood by reference to figs. 4 and 5, each representing an independent docker, or presser, pricker, and stamper, for a single cracker.

The oscillating plate, or lever E', shown in fig. 1, (there being corresponding mechanism on the opposite side of the machine,) as its forward end goes down, presses upon a projection, Q, extending from the plate *o* through a slot, *q*, outside of the frame of the machine; and, the same pressure being given, by the same means, on each end of said plate, it is depressed, carrying plates *p*, *r*, and *s*, with it, until the flanges *t*, on the lower side of plate *s*, reach the solid table or bearing on which the endless apron moves, when the further downward movement of the plates *s* and *r* will be arrested by said flanges.

The prickers *v*, which are small wires or needles, fixed firmly at their upper ends in plate *p*, pass through perforations in plate *s*.

The plates *r* and *s* are attached rigidly together by means of a suitable number of rivets firmly affixed to each, and passing loosely through holes in plate *p*.

W is a stamping-block, upon the face of which a name may be engraved. It is not desirable that this block, to make its impression in the cracker, should descend as low as the prickers There is, therefore, a small space between the top of the block and plate *p* when said plate is not pressed down, as will be seen in fig. 4, so that said stamping-block will not descend below the face of plate *s* until the prickers have penetrated some distance into the cracker; but when said plate *p* comes in contact with the upper surface of the stamping-block, it will press the same down, so as to make the proper impression in the cracker.

Figure 4:
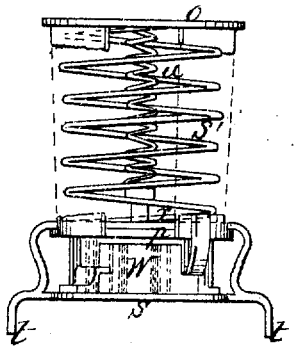
Figure 4 is a detached view of the mechanism by which a single cracker is pressed, pricked, and stamped by a single operation.
Figure 5:
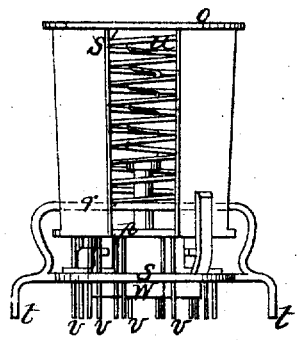
Figure 5 is another view of the same device, with the prickers and stampers pressed down.

When the front ends of the levers F' are elevated, the springs J and J' will elevate the docker, consisting of plates *o*, *p*, *r*, and *s*, with their attachments; and, at the same time, the spiral springs S' will raise plate *p* until it comes in contact with plate *r*, withdrawing the prickers until they come flush with the lower side of plate *s*, as shown in fig. 4; and, in like manner, the spiral springs *u* will raise the stamping-block W flush with the lower side of said plate *s*.

Thus it will be seen that the pressing, pricking, and stamping of a row of crackers will be performed simultaneously by one operation of the machine.

Figure 7:
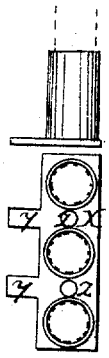
Figure 6:
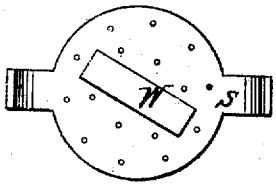
Figure 6 is a view of the under side of the lower, or face plate of said pressing, stamping, and pricking-device.

The lower sections T' of the dough-conducting tubes are each enclosed in a sliding thimble; and each of said thimbles passes through and is firmly fixed in a plate, X, Figure 7, which plate has projections *y*, with which plate *p* will come in contact as the presser descends, carrying down said thimbles to the surface of the endless apron as the knife makes its stroke and cuts off the sections of dough, the office of said thimbles being to guide the crackers, or sections of dough, in their descent from the lower ends of tubes T' to the apron.

As the docker rises, said thimbles are carried up by spiral springs *z* until their lower ends are flush with the lower ends of said tubes T', so that the row of crackers just cut off and deposited upon the apron may be carried forward toward the docker by the next movement of said apron.

Figure 8:
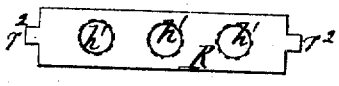

To prevent the crackers from sticking to plate *s* as the docker rises, I interpose a thin metal plate, R, a detached plan view of which is shown in Figure 8.

This plate has as many holes *h'* as there are dough-conducting tubes, and each hole is directly in front of a tube.

Said holes are large enough to permit the prickers and stampers to work through them, but not quite so large as the cracker when pressed.

Said plate R is attached to the docker by means of springs, which hold it up close against the plate *s*, except when forcibly separated from it, as hereinafter described.

$r^2$ $r^2$ are two elastic stops, one on each side of the frame, opposite the docker, with which the ends $r^2$ of said plate R will come in contact as the docker rises, causing said plate R to separate briefly from the plate *s*; but as soon as it has passed by said stops, it will be again drawn up to plate *s* with a sudden jar, which will be sure to detach any crackers adhering to the docker.

In the drawings only three grooves are shown in each of the rollers H and H'; but in a working-machine, it is proposed to increase the number to fifteen or twenty, or, in fact, to any other number that may be desired, within practicable bounds.

The said rollers H and H', by means of cog-wheels $H^2$ and $H^3$, are made to rotate together.

It will be observed that the machine is so geared, that when the docker and the knife are operating, the endless apron and the rollers H and H' will remain still, and that said endless aprons and rollers make their intermittent movements, respectively, while the knife and docker are not operating.

Having thus fully described my machine, and its mode of operation,

What I claim therein as new, and desire to secure by Letters Patent, is—

1. The conducting-tubes, divided into parts T and T', in combination with the knife K, working between them, substantially as described.

2. The knife K, consisting of a thin plate of sheet-metal, provided with apertures for the dough to pass through, in combination with a spring to throw the knife, and the lever *i* and cam *i'*, to move back the knife, so that the dough can again pass through the holes, substantially as described.

3. In combination with mechanism for feeding the dough to form the crackers in cylindrical strips, through tubes or holes, a reciprocating knife, with apertures in it for the dough to pass through, and so operated as to sever from each of said strips, at suitable intervals, a section to form a cracker, substantially as described.

4. The outside tubes, or thimbles, working on the lower sections T' of the conducting-tubes, and operated substantially as described.

5. The docker, consisting of the plates *o*, *p*, *r*, and *s*, the prickers *v*, stamper W, and spiral springs S' and *u*, all combined, constructed, and operating substantially as described, to press, prick, and stamp a row of crackers at one operation, substantially as described.

6. The mechanism moved by a crank on the main driving-shaft, by means of which an intermittent motion is given to the grooved rollers, the endless apron, and the docker, substantially as described.

7. Also, in combination with the docker, the thin plate R, constructed, arranged, and operating substantially as and for the purpose described.

JOHN E. HAWKINS.

Witnesses:
J. J. COOMBS,
J. L. COOMBS.